Figure 1:
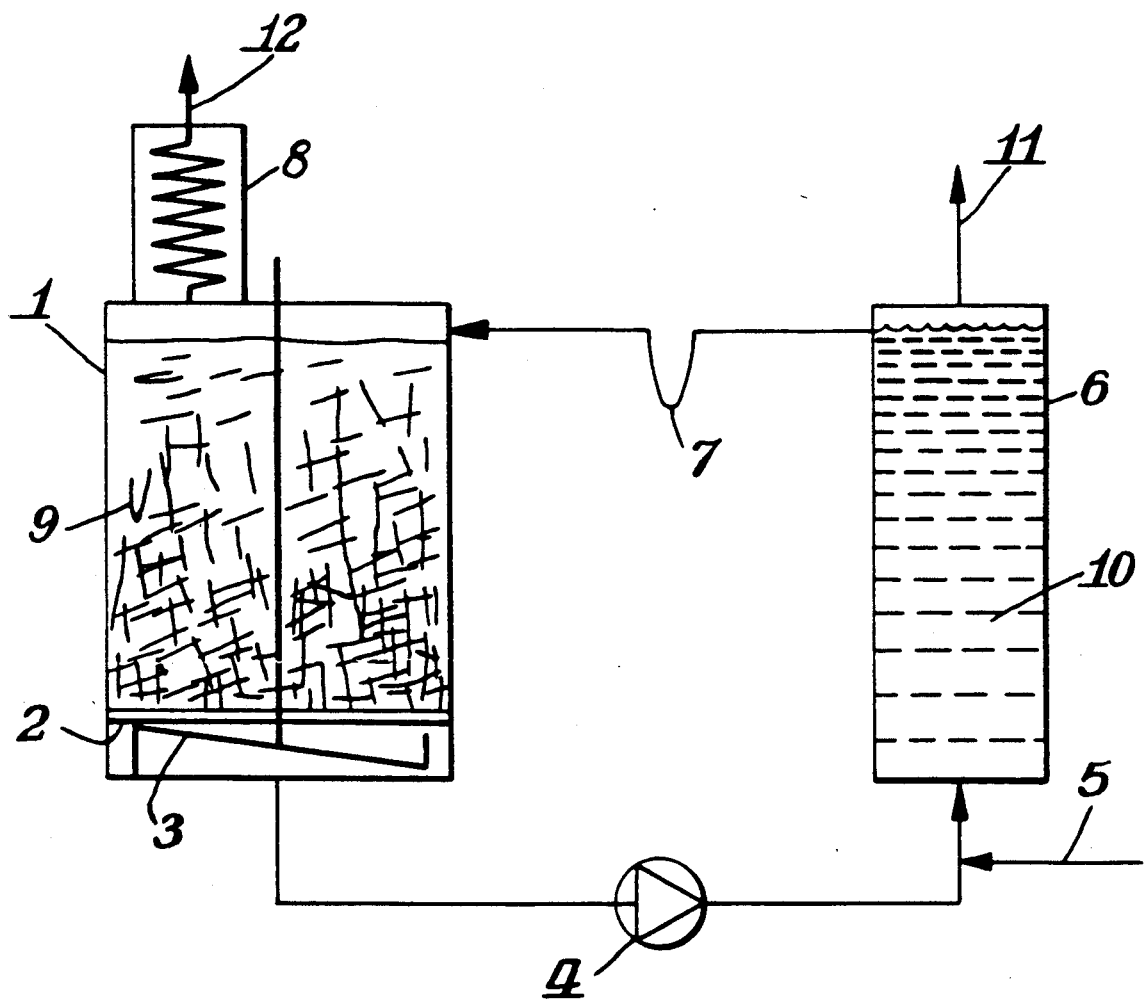

United States Patent [19]
Kröckert et al.

[11] Patent Number: 5,032,180
[45] Date of Patent: Jul. 16, 1991

[54] PROCESS FOR THE PRODUCTION OF IRON OXIDE YELLOW PIGMENTS

[75] Inventors: Bernd Kröckert, Wesel; Helmut Printzen, Krefeld; Karl-Werner Ganter, Krefeld; Gunter Buxbaum, Krefeld, all of Fed. Rep. of Germany

[73] Assignee: Bayer Aktiengesellschaft, Fed. Rep. of Germany

[21] Appl. No.: 529,104

[22] Filed: May 25, 1990

[30] Foreign Application Priority Data

Jun. 9, 1989 [DE] Fed. Rep. of Germany ....... 3918894

[51] Int. Cl.$^5$ .............................................. C09C 1/22
[52] U.S. Cl. .................................... 106/459; 106/456; 423/633
[58] Field of Search ................ 106/456, 459; 423/632, 423/633, 635

[56] References Cited

U.S. PATENT DOCUMENTS

| 1,327,061 | 1/1920 | Penniman | 423/632 |
| 1,368,748 | 2/1921 | Penniman | 423/633 |
| 4,221,766 | 9/1980 | Pabst | 423/140 |

Primary Examiner—William R. Dixon, Jr.
Assistant Examiner—Chris Gallo
Attorney, Agent, or Firm—Connolly & Hutz

[57] ABSTRACT

A process for the production of iron oxide yellow pigments by the Penniman-Zoph process from the raw materials iron (II) sulfate, sodium hydroxide and metallic iron, is disclosed in which iron (II) is oxidized to iron (III) by gassing with air in the presence of goethite nuclei, the iron (III) sulfate is dissolved to form iron (II) and the goethite nuclei are built up to iron oxide yellow pigments, characterized in that the gassing with air and dissolving of the metal are carried out in separate vessels.

9 Claims, 1 Drawing Sheet

PROCESS FOR THE PRODUCTION OF IRON OXIDE YELLOW PIGMENTS

This invention relates to a process for the production of iron oxide yellow pigments by the Penniman-Zoph process from the raw materials iron(II) sulfate, sodium hydroxide and metallic iron, in which iron(II) is oxidized to iron(III) by exposure to air in the presence of goethite nuclei, the iron(III) sulfate is dissolved to form iron(II) and the goethite nuclei are built up to iron oxide yellow pigments.

Iron oxide pigments can be produced by the aniline process, the precipitation process and the Penniman-Zoph process (Winnacker-Küchler, Chemische Technologie, Vol. 3, Anorg. Technologie II, 4th Edition 1983, pages 376–380).

The aniline process, in which nitrobenzene is reduced to aniline by metallic iron, is expensive on equipment because chloride-containing suspensions are used and cause serious corrosion of the equipment used.

In the precipitation process, iron(II), for example from iron(II) sulfate, is oxidized to iron(III) by oxygen. The protons released during formation of the pigment are neutralized by sodium hydroxide. Accordingly, 1 mol sodium sulfate is formed per mol iron sulfate and accumulates as a salt load:

$$2\ FeSO_4 + 4\ NaOH + 0.5\ O_2 \rightarrow 2\ FeOOH + 2\ Na_2SO_4 + H_2O \tag{1}$$

In ecological terms, the Penniman process is preferable to the precipitation process because the iron sulfate used in the Penniman process serves solely as a catalyst so that the salt load is considerably reduced. The Penniman process can be carried out without difficulty in stainless steel vessels because sulfate solutions are considerably less corrosive than chloride solutions.

In the standard Penniman process (U.S. Pat. Nos. 1,327,061 and 1,368,748), goethite nuclei produced independently from iron(II) sulfate and sodium hydroxide (equation 1) are built up to pigments. The pigments are formed from the goethite nuclei in apparatus in which a suspension of iron(II) sulfate and the nuclei circulates while gassing with air around scrap iron arranged on sieve plates or in baskets. A major disadvantage of the standard Penniman process lies in the fact that the suspension has to be gassed with air so that large quantities of heat are lost in the form of steam. Since hydrogen is formed in the Penniman process, it is necessary on safety grounds to carry out the process at temperatures above 85° C., because it is only a sufficiently high steam content over the suspension that makes the formation of an ignitable mixture impossible. This means that energy cannot be saved by lower reaction temperatures during the gassing with air. Gassing with pure oxygen or with oxygen-enriched air in a standard Penniman apparatus is extremely hazardous because explosive gas mixtures can be formed. Reactions in the Penniman process:

$$2\ FeSO_4 + 3\ H_2O + 0.5\ O_2 \rightarrow 2\ FeOOH + 2\ H_2SO_4 \tag{2}$$

$$2\ Fe + 2\ H_2SO_4 \rightarrow 2\ FeSO_4 + 2\ H_2 \tag{3}$$

In addition, the utilization of gas in standard Penniman apparatus is highly unsatisfactory because the gas readily coalesces on the scrap iron present, leaving the suspension almost ineffectually in the form of large bubbles.

U.S. Pat. Nos. 2,111,726, 1,327,061 and DD-A 208 599 describe various types of reactors which are attended by the disadvantages mentioned above. DD-A 208 599, FIG. 3, discloses a process which is questionable in the form illustrated. In this process, the scrap iron is accommodated in a separate reactor and, according to FIG. 3, the acidic suspension is gassed before the reactor filled with scrap iron. An arrangement such as this is critical because ignitable mixtures can be formed under the standard process conditions (U.S. Pat. Nos. 1,327,061 and 1,368,748).

The problem addressed by the present invention is to provide a process for the production of iron oxide yellow pigments by the Penniman process which does not have the described disadvantages of the prior art.

Surprisingly, the Penniman process can be divided into two steps, thereby obviating the described disadvantages. Dissolving of the scrap iron and gassing with air take place in two separate vessels.

Accordingly, the present invention relates to a process for the production of iron oxide yellow pigments by the Penniman-Zoph process from the raw materials iron(II) sulfate, sodium hydroxide and metallic iron, in which iron(II) is oxidized to iron(III) by gassing with air in the presence of goethite nuclei, the iron(III) sulfate is dissolved to form iron(II) and the goethite nuclei are built up to iron oxide yellow pigments, characterized in that the gassing with air and dissolving of the metal are carried out in separate vessels.

An apparatus in which the process according to the invention may be carried out is schematically illustrated in FIG. 1 wherein the reference numerals have the following meanings: 1=metal dissolving vessel, 2=sieve plate, 3=underfloor stirrer, 4=pump, 5=gas input through two-component nozzles, 6=gassing vessel, 7=siphon, 8=condenser, 9=scrap iron, 10=suspension, 11=gas outlet, 12=hydrogen outlet.

In the metal dissolving vessel (1) filled with scrap iron, the scrap iron (9) is dissolved by the acidic suspension (10) with evolution of hydrogen (12). The hydrogen can be removed together with natural gas in the form of non-explosive mixtures and used, for example, in a power station.

In one preferred embodiment of the process according to the invention, therefore, the hydrogen formed in the metal dissolving vessel is removed under control. Metal-free suspension is then advantageously pumped from the metal dissolving vessel into the gassing vessel. This suspension is enriched with iron(II) for a reduced proton content.

In this preferred embodiment, the gassing with air may be carried out using two-component nozzles (5) or gassing coils in the base of the vessel. On completion of oxidation and after hydrolysis, the suspension (10) returns to the metal dissolving vessel. It is important in this regard that the gas spaces of both vessels are kept separate, for example by a siphon (7).

If the metal dissolving vessel (1) is conical in shape, there is no need for the underfloor stirrer (4).

Depending on the capacity of the metal dissolving vessel (1), its dimensions should be selected so that, for example where loose scrap iron is used, its diameter is larger, which makes charging easy. Where bundled scrap iron is used, the vessel may have a narrow diameter.

Several variants of the gassing vessel (6) are also possible. It may be designed as a conical vessel and also as a bubble column (depending on the application). Since hydrogen is formed in the scrap dissolving vessel, it is advisable on safety grounds to provide steam valves above the suspension in the metal dissolving vessel (1) in order to render the gas space inert with steam in the event of possible accumulations of hydrogen.

The type of pump (4) is largely dependent on the size of the plant and must be adapted accordingly. The pumping rate is dependent on the pigment to be produced. To keep metal particles away from the pump and to avoid their transfer to the gassing vessel, it is advisable to arrange a fine-mesh sieve and/or a magnetic separator in front of the pump. The metal-free suspension is preferably degassed before or in the pump.

In one preferred embodiment of the process according to the invention, the temperature in the gassing vessel is 20° to 100° C. and preferably 60° to 90° C.

At the beginning of the reaction, the quantity of nuclei is advantageously 0 to 20 g/l and preferably 0.5 to 15 g/l. Preferably 5 to 80 g/l and, more preferably, 10 to 60 g/l $FeSO_4$ are present at the beginning of the reaction.

The metal-free suspension is preferably degassed before or in the pump.

The arrangement shown in FIG. 1 has many advantages. Where air is used for gassing, heat is only discharged from the gassing vessel whereas the second part of the suspension undergoes hardly any heat loss. Where gassing is carried out with oxygen, which is advantageously possible because the gas spaces are separated and hydrogen is not mixed with oxygen, the heat loss from the gassing vessel is also minimal and, ideally, emanates solely from the vapor pressure of the water.

Another advantage of the separate gassing lies in the fact that the gas bubbles no longer coalesce during gassing, which provides for considerably better gas distribution.

The coloristics of the pigments are not adversely affected by the process. In tests, the color values of the pigments were always better than in comparable tests carried out in a standard Penniman apparatus.

The heat loss may be described by the so-called heat flow Q:

$$Q = \frac{Pw}{P - Pw} \Phi g \Delta Hw$$

wherein
P = total pressure (bar)
Pw = vapor pressure of the water at the reaction temperature (bar)
$\Phi g$ = gas flow rate (mol/h)
Hw = heat of evaporation of the water (kJ/mol)
Q = heat flow or energy loss (kJ/h)

The heat flow is thus a measure of the quantity of heat leaving the system per hour. The figures in the Examples are based on suspensions having a temperature of 85° C. and are calculated using the heat of evaporation of pure water, in other words the figures provide only a qualitative measure of the heat loss.

The hues of all the samples were determined in Alkydal® F 48, a product of Bayer AG, a medium-oil alkyd resin, for a pigment volume concentration of 10% in accordance with DIN 6174 (equivalent to ISO DIN 7724, 1-3 drafts).

The following Examples are intended to illustrate the invention without limiting it in any way.

EXAMPLE 1

Nucleus formation:

30% Sodium hydroxide is added with stirring to an aqueous solution of iron(II) sulfate containing 200 g/l $FeSO_4$ in such a quantity that 40% of the iron can be precipitated as iron(II) hydroxide. By gassing with air at 30° to 35° C., Fe(II) is oxidized to Fe(III), the pH value falling from 6 to 3.5. This completes nucleus formation.

The pigment is built up in an apparatus of the type shown in FIG. 1. In the test in question, the quantity of suspension in the gassing vessel (6) is 30 l with no input of gas. The metal dissolving vessel (1) contains 60 l suspension. 90 g/l scrap iron, based on the total suspension, are then added to the suspension. The suspension is prepared so that 7 g/l nucleus expressed as FeOOH and 40 g/l $FeSO_4$ are present. The suspension is pump-circulated at 400 l/h and heated to 85° C. On reaching the temperature of 85° C., 600 l/h air are introduced into the gassing vessel through a two-component nozzle in the base. After 64 hours, the pigment has been sufficiently built up. It is filtered, washed until free from salt and dried at 120° C.

The color values listed in the following Table show that the product obtained has better coloristics than a product produced under otherwise the same conditions in a standard Penniman apparatus. Positive values for $\Delta L^*$ and $\Delta C^*$ indicate the improvement.

|  | L* | a* | b* | c* | h |
|---|---|---|---|---|---|
| Product, Example 1 X | 59.1 | 10.9 | 45.9 | 47.2 | 76.6 |
| Comparison product Y | 58.9 | 10.9 | 44.9 | 46.2 | 76.4 |
| ΔX to Y | +0.2 | 0 | +1.0 | +1.0 | +0.2 |

In the test carried out, the quantity of heat leaving the system per hour amounts to only one third of the quantity released in the conventional process.

In the present case, the enthalpy of evaporation ΔHw at 85° C. is 41.4 kJ/mol which, for a gas flow rate of 600 l/h, corresponds to a heat loss of 1519 kJ/h or 422 watts as opposed to 4557 kJ/h or 1266 watts in standard Penniman apparatus.

EXAMPLE 2

The procedure is as in Example 1, except that gassing is carried out with 60 l/h pure oxygen.

The heat loss assumes a value of 152 kJ/h or 42 watts as opposed to 4557 kJ/h or 1266 watts in a standard Penniman apparatus.

The color values are better than in the comparison test in a standard Penniman apparatus.

|  | L* | a* | b* | c* | h |
|---|---|---|---|---|---|
| Product, Example 2 Z | 59.5 | 10.8 | 45.6 | 46.9 | 76.7 |
| Comparison product Y | 58.9 | 10.9 | 44.9 | 46.2 | 76.4 |
| ΔZ to Y | +0.6 | −0.1 | +0.7 | +0.7 | +0.3 |

We claim:

1. A process for the production of iron oxide yellow pigments by the Penniman-Zoph process from the raw materials iron (II) sulfate, sodium hydroxide and metallic iron, in which iron (II) is oxidized to iron (III) by gassing with oxygen in the presence of goethite nuclei, the iron (III) sulfate is dissolved to form iron (II) and the geothite nuclei are built up to iron oxide yellow pigments, and carrying out the gassing with the oxygen and dissolving of the metal in separate vessels.

2. A process as claimed in claim 1, characterized in that the hydrogen formed in the metal dissolving vessel is removed under control.

3. A process as claimed in claim 1, characterized in that metal-free suspension is pumped from the metal dissolving vessel to the gassing vessel.

4. A process as claimed in claim 1, characterized in that the temperature in the gassing vessel is 20° to 100° C.

5. A process as claimed in claim 1, characterized in that the quantity of geothite nuclei at the beginning of the reaction is 0 to 20 g/l, expressed as FeOOH.

6. A process as claimed in claim 1, characterized in that the quantity of geothite nuclei at the beginning of the reaction is 0.5 to 15 gl, expressed as FeOOH.

7. A process as claimed in claim 1, characterized in that 5 to 80 g/l $FeSO_4$ are present at the beginning of the reaction.

8. A process as claimed in claim 1, characterized in that 10 to 60 g/l $FeSO_4$ are present at the beginning of the reaction.

9. A process as claimed in claim 1, characterized in that the temperature in the gassing vessel is 60° to 90° C.

* * * * *

UNITED STATES PATENT AND TRADEMARK OFFICE
CERTIFICATE OF CORRECTION

PATENT NO. : 5,032,180

DATED : JULY 16, 1991

INVENTOR(S) : BERND KROCKERT ET AL

It is certified that error appears in the above-identified patent and that said Letters Patent is hereby corrected as shown below:

Column 5, line 3:
In claim 1, line 7, after "pigments," insert -- the improvement which comprises --; and delete the word "and".

Signed and Sealed this

Eighth Day of December, 1992

Attest:

DOUGLAS B. COMER

*Attesting Officer*  *Acting Commissioner of Patents and Trademarks*